United States Patent Office 2,909,563
Patented Oct. 20, 1959

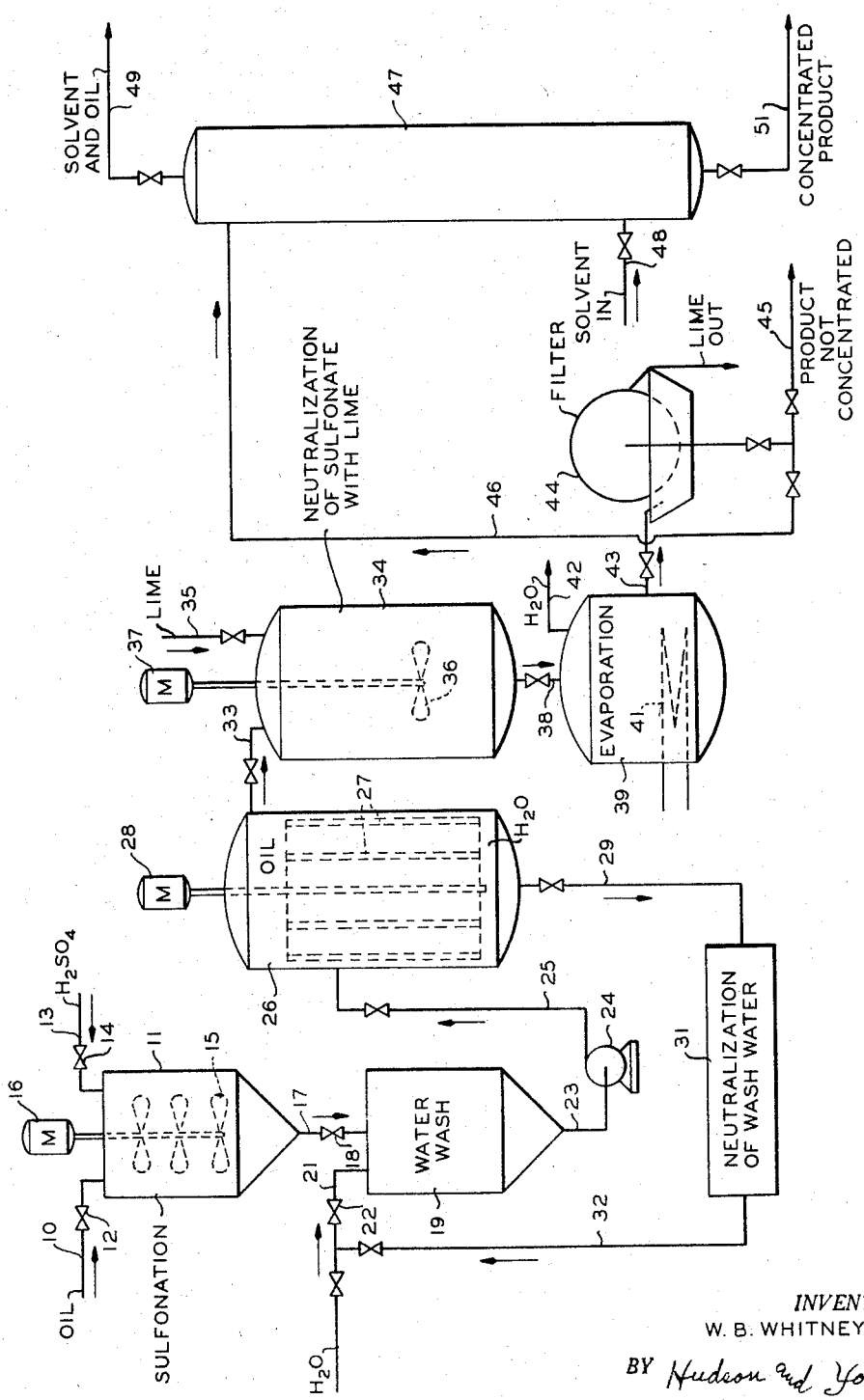

2,909,563

PRODUCTION OF PETROLEUM SULFONATES

William B. Whitney, Bartlesville, Okla., assignor to Phillips Petroleum Company, a corporation of Delaware Application September 6, 1955, Serial No. 532,419

9 Claims. (Cl. 260—504)

This invention relates to an improved process for the preparation of petroleum sulfonates from a high molecular weight, highly refined, lubricating stock and an apparatus for the preparation of such petroleum sulfonates.

As the speed and out-put of internal combustion engines have increased to higher values, the ability of hydrocarbon oils to maintain an engine free from lacquer, sludge and carbon deposits has decreased. Under present day conditions, lubricating oils for use in automotive and diesel engines require the use of additive agents which have detergent properties. Also, stop-and-go driving in cold weather has a tendency to produce sludge in a lubricating system and additives are needed to combat this problem.

It is well known that oil-soluble metal petroleum sulfonates have been used in imparting detergent properties to mineral oils. The petroleum fraction sulfonated, however, is usually an unrefined naphthenic base oil of 300 to 500 molecular weight. The preferred lubricating oil stock employed in the present invention is a highly refined, paraffinic, high molecular weight fraction such as that represented by dewaxed, solvent refined bright stock having a viscosity of 150 to 230 SUS at 210° F., and having a molecular weight of 600 to 800. This is in direct contrast to the unrefined, naphthenic, low molecular weight stock previously described as the customary source of petroleum sulfonates.

In the sulfonation of petroleum stocks to form petroleum sulfonic acids and their salts, an execess of sulfuric acid remains which must be removed from the desired sulfonates. Conventional separation methods remove an acid sludge from petroleum sulfonates obtained from unrefined stocks of relatively low molecular weight; but these methods are not applicable when high molecular weight, highly refined oils are employed in the preparation of petroleum sulfonates. When unrefined stocks of relatively low molecular weight, are sulfonated a phase separation occurs and the sulfonated soil can be decanted, or otherwise directly separated from an acid sludge phase containing excess sulfonating agent. When a highly refined, high molecular weight petroleum fraction is sulfonated, e.g., with fuming sulfuric acid, there is no phase separation and the removal of excess sulfonating agent presents a problem. Conventional methods of water washing materials result in the formation of stable emulsions. Neutralization of the products of sulfonation with ammonia and separation of the desired product as an alcoholic solution of ammonium sulfonate and subsequent conversion to the alkaline earth salts has been found to be a satisfactory process. Direct neutralization of the sulfonation products with lime also provides a means for separating and recovering the sulfonation products. The present invention provides an improvement over the above methods in achieving increased economy of operation and in minimizing the amount of solids which must be mechanically handled.

In accordance with the present invention, I have found a method by which the major portion of the excess sulfuric acid remaining after sulfonation of a high molecular weight, highly refined oil can be removed by water washing without formation of undesirable emulsions which otherwise form in the presence of petroleum sulfonates derived from high molecular weight, highly refined oil. Broadly, the process of my invention comprises the steps of sulfonating a high molecular weight, highly refined oil such as a solvent refined bright stock, using sufficient oleum so as to form appreciable quantities of sulfonic acid, removing the major portion of the excess sulfuric acid present by water washing with at least 3 volumes of water per volume of reaction mixture, separating the aqueous layer from the oil layer, and recovering the sulfonic acids as such or as a salt, e.g., by neutralizing the sulfuric acid and oil layer with an excess of calcium hydroxide, evaporation of water in the resulting mixture and filtering to remove any calcium sulfate formed and remaining calcium hydroxide from the desired calcium sulfonate product and unreacted oil. If desired, the sulfonates can be concentrated by removal of the unreacted oil by solvent extraction with a polar organic solvent such as methyl isobutyl ketone and alcohol, or a non-polar solvent such as liquefied normally gaseous hydrocarbons, for example, propane and butane.

It is, therefore, an object of this invention to provide an improved method for preparing petroleum sulfonates from a high molecular weight, highly refined oil. It is also an object of this invention to provide an improved apparatus for the continuous preparation of petroleum sulfonates from a high molecular weight, highly refined oil. It is another object to provide improved means for the separation of petroleum sulfonates, prepared from high molecular weight, highly refined oil, from sulfonation reaction by-products. An improved method for removing excess acid remaining after sulfonation of a high molecular weight, highly refined oil is still another object of this invention. Other objects and advantages will be apparent to one skilled in the art upon study of this disclosure including the appended drawing.

The step of washing the sulfonated oil, i.e., treating the sulfonated mass with wash water in order to separate unreacted acid, is conducted in such a manner so as to leave as little uncombined acid as possible in the sulfonated oil and still not yield an excessive amount of draw-off waste or acid-water. The water can be added to the sulfonated oil either cold or hot, although cold is preferred as heat is evolved by dilution of the sulfuric acid; however, all of the water must be added prior to any agitation of the sulfonated mass. If the water is added during agitation an emulsion will result. A minimum of 2.75 volumes of water/volume of oil is required during the water washing step to satisfactorily remove a major portion of the unreacted acid, and at the same time not produce an emulsion; however, I prefer to employ at least 3 volumes of water/volume of oil. Usually a single washing step will be adequate to remove a major portion of the unreacted acid; however, if desired, a series of water wash steps may be employed. One satisfactory method of carrying out the water washing step involves adding the required amount of either hot or cold water to the quiescent reaction mixture in a vessel, agitating the mixture, allowing the mixture to separate into two phases, and passing the top, or oil layer, and the bottom, or acid-water layer, to subsequent treatment. Another and more preferred method of carrying out the water washing step is to add the reaction mixture to a vessel containing sufficient water so that there is always at least three volumes of water per volume of reaction mixture. When operating according to this method the mixture can be agitated during addition of reaction mixture and therefore this method of water washing is preferred for continuous operation.

It is preferred to provide a temperature in the range of 150 to 200° F. during the mixing step when either method of washing is utilized. A portion of the heat required will be obtained by the heat of dilution of the sulfuric acid in water. If additional heat is required it can be added by conventional means such as a steam coil.

Referring now to the drawing, oil to be sulfonated is introduced through line 10 to reactor 11 and flow is controlled by valve 12. Fuming sulfuric acid is introduced through line 13 and flow is controlled by valve 14. The contents of the reactor are agitated by stirrer 15 which is actuated by motor 16. The reaction mixture passes from reactor 11 through line 17 and valve 18 to wash vessel 19. Water enters wash vessel through line 21 and the flow is controlled by valve 22. Reaction mixture and water leave wash vessel 19 by way of line 23 and are mixed in pump 24 and passed by line 25 to separator 26 where the sulfonation products and unreacted oil rise to the top and the acidulated water settles to the bottom. The contents of separator 26 are gently stirred by stirrer 27 which is actuated by motor 28. Water is drawn from separator 26 through line 29 and passed to neutralization vessel 31, which can be a pond containing limestone. The neutralized water is returned to wash vessel 19 by way of line 32. Part or all of the water can be removed from the system before or after neutralization if desired.

The sulfonated products and unreacted oil are withdrawn from separator 26 through line 33 and passed to sulfonic acid neutralization vessel 34. Lime is introduced through line 35 and the resulting slurry is agitated by stirrer 36 actuated by motor 37. Neutralized products are withdrawn through line 38 and passed to evaporator 39 where water, introduced with the lime, and resulting from the neutralization reaction, is evaporated by means of heat from heater 41 and removed through line 42.

The neutralized products are removed through line 43 and if desired (not shown) a diluent such as SAE 10 oil or light hydrocarbon may be added before passing to filter 44 where the lime is removed. The diluent can be removed from the product by distillation or by a flashing step. The product, containing unreacted oil, can be recovered through line 45 or can be passed through line 46 to solvent extraction vessel 47. Solvent is added through line 48, so as to pass countercurrently to the flow of product feed, a solution of solvent and oil is removed through line 49, and concentrated product is recovered through line 51.

In a specific embodiment, petroleum sulfonates having exceptional lubricating oil additive properties are obtained from a sulfonation base stock selected from the more viscous bright stock fractions of petroleum and having a viscosity of 120 to 700 SUS at 210° F. I prefer to employ deasphalted and solvent-refined petroleum fractions having a viscosity between about 150 and 600 SUS at 210° F. A specifically preferred sulfonation stock is a propane-fractioned, solvent extracted and de-waxed Mid-Continent oil of about 200 to 230 SUS at 210° F. having a viscosity index of about 85 to 95 or even higher.

I prefer to use oleum as the sulfonating agent. The oleum can vary from 10 percent excess $SO_3$ to 40 percent excess $SO_3$; however, I prefer to use commercial oleum, which represents about 20 percent excess $SO_3$. Sulfonation temperatures are ordinarily controlled within the range of about 50–200° F. with a preferred operating range between 80–150° F. Lower temperatures can be used without seriously slowing down reaction rates, but no particular advantage results. At temperatures above about 200° F., excessive oxidation with liberation of $SO_2$ takes place. The acid/oil ratio employed can range from about 0.2/1 to about 0.6/1 depending upon the sulfonation temperature employed.

All metals are suitable for preparing my metal petroleum sulfonates. Metals which have been found to be particularly suitable for preparing the metal petroleum sulfonates of this invention include barium, calcium, lithium, potassium, nickel, cobalt, cadmium, silver, iron, aluminum, copper, magnesium, lead, beryllium, mercury, sodium, tin, and zinc.

The sulfonation reaction is more fully disclosed in my copending application Serial Number 478,839, filed December 30, 1954.

The alkaline earth metals are preferred and barium and more especially calcium are specifically preferred in the practice of this invention. The water-washed petroleum sulfonates of my invention are preferably neutralized with an aqueous slurry or suspension of hydrated lime. The amount of lime slurry added to the petroleum sulfonates is preferably in excess of that required to neutralize the oil, i.e., 3 percent to 10 percent excess. The mixture, upon completion of the neutralization, is preferably heated to an elevated temperature so as to remove the residual water by evaporation. To the oil containing oil-soluble calcium sulfonate, calcium sulfate, and excess lime is added a small amount of a filter aid, for example, celite, and the mixture heated to a temperature between 200° F. and 250° F. and filtered at such temperatures to remove the insoluble calcium compounds. SAE 10 stock or hydrocarbon solvent such as pentanes, hexanes, octanes, etc., may be added, if desired, to increase the ease of filtering. In order to increase the content of calcium sulfonate in the oil, the solution after the filtration step can be subjected to solvent fractionation with a polar solvent such as isopropyl alcohol, methyl isobutyl ketone, butyl alcohol, and the like, by conventional liquid-liquid solvent extraction methods or a non-polar solvent such as liquified normally gaseous hydrocarbons.

The process of the present invention possesses a number of advantages which makes the process very desirable. The most important advantages are: (1) no solvents are required, unless dilution is made prior to filtration, other than water, which is a relatively inexpensive solvent, (2) the major portion of the excess sulfuric acid is removed as liquid instead of solid, thus simplifying the equipment required, (3) the spent acid can be simply and economically neutralized in an acid waste pond with limestone, which is an inexpensive base or the spent acid may be concentrated and recovered, and (4) the process minimizes the amount of inorganic salts that have to be removed.

The following examples illustrate the invention but should not be construed to limit the invention.

*Example I*

One hundred grams of dewaxed, solvent refined, lubricating oil of 203 S.U.S. at 210° F. was sulfonated with 11.1 cc. of twenty percent fuming sulfuric acid. The sulfonation was carried out at 100° F. for one hour. The sulfonated oil was then divided into two equal portions. The first was treated with an equal volume of water, agitated and heated. As soon as an emulsion appeared, a great excess of water was added. The emulsion became very thick. To the second portion was added three times its volume of water, the mixture heated to 160° F., and then agitated. The agitation was not started until all of the water was present. A separation of clear acid was made from the bottom.

*Example II*

Twenty pounds of dewaxed, solvent refined, lubricating oil stock of 203 S.U.S. at 210° F. was sulfonated with oleum containing 20 percent excess $SO_3$ at 100° F. for 1 hour. Water was added to the reaction mixture in the ratio of 3.5 lbs. water per lb. of reaction mixture. After all of the water was added the mixture was agitated and the temperature was raised to 170° F. Water was allowed to evaporate until an emulsion began to form. The mixture remained fluid during the washing step. The evaporated water was determined to be 0.5 lb. of water per lb. of reaction mixture.

These results show that a minimum of 3 lb. water per lb. of reaction product are required during the washing step so as to avoid an emulsion. This is equivalent to about 2.7 volumes of water per volume of reaction product.

Reasonable variations and modifications are possible within the scope of the disclosure of the invention, the essence of which is the discovery that residual acid can be removed from the reaction products obtained by sulfuric acid sulfonation of high molecular weight, highly refined lubricating oil by adding thereto at least about 3 volumes of water per volume of reaction mixture and stirring or otherwise agitating the resulting mixture.

That which is claimed is:

1. In a process for the preparation of metal petroleum sulfonates by the sulfonation of high molecular weight, highly refined petroleum fractions having a viscosity of about 150 to about 600 SUS at 210° F. and a viscosity index of at least 85 with fuming sulfuric acid, separation of the sulfonated oil from remaining sulfuric acid and conversion of the sulfonic acids to metal sulfonates the improvement comprising contacting the sulfonation reaction products with at least 3 volumes of water per volume of reaction mixture; agitating said reaction mixture and water so that at least 3 volumes of water are present with each volume of reaction mixture during said agitation so as to dissolve unreacted sulfuric acid; recovering sulfonated product from said mixture; contacting said sulfonated product with an excess of the hydroxide of said metal so as to convert sulfonated oil to metal sulfonate; removing water and solid inorganic material from said sulfonate; and recovering metal sulfonate as a product of the process.

2. The process of claim 1 wherein the water is added to quiescent sulfonated product.

3. The process of claim 2 wherein the mixture is heated to a temperature in the range about 150 to about 200° F. during the agitating step.

4. The process of claim 1 wherein the sulfonated product is added to the water with agitation.

5. The process of claim 4 wherein the mixture is heated to a temperature in the range about 150 to about 200° F. during the agitating step.

6. In the process for the preparation of alkaline earth metal petroleum sulfonates which comprises contacting a propane-fractionated, solvent-extracted and dewaxed Mid-Continent oil having a viscosity between about 150 to about 230 SUS at 210° F. and a viscosity index of at least 85 with oleum containing from 10 to 40 percent excess $SO_3$ at a temperature in the range 50 to 200° F. for a time sufficient to sulfonate a portion of said oil; the improvement comprising contacting the product of sulfonation with at least three volumes of water per volume of reaction mixture at a temperature above 150° F.; intimately mixing the resulting mixture so that at least 3 volumes of water are present per volume of reaction mixture during said mixing so as to remove unreacted oleum from the sulfonation product; separating the sulfonation product from the water; contacting the sulfonation product with an excess of the hydroxide of said alkaline earth metal so as to convert said sulfonated oil to alkaline earth metal sulfonate; removing water and solid inorganic material from said sulfonate; and recovering alkaline earth metal sulfonate.

7. The process of claim 6 wherein the water is added to quiescent sulfonated product.

8. The process of claim 6 wherein the sulfonated product is added to the water with agitation.

9. In a process for the sulfonation of high molecular weight, highly refined petroleum fractions having a viscosity of about 150 to about 600 SUS at 210° F. with fuming sulfuric acid and separation of the sulfonated oil from remaining sulfonating agent the improvement comprising contacting the sulfonation reaction mixture with at least three volumes of water per volume of reaction mixture; mixing the reaction mixture and water so that at least 3 volumes of water are present per volume of reaction mixture during said mixing so as to dissolve unreacted sulfonating agent; and separately recovering a sulfonated oil phase and an acidulated water phase.

References Cited in the file of this patent

UNITED STATES PATENTS

| | | |
|---|---|---|
| 2,204,969 | Percy | June 18, 1940 |
| 2,246,374 | Lohman et al. | June 17, 1941 |
| 2,807,589 | Mitchell et al. | Sept. 24, 1957 |
| 2,820,056 | Gerhart et al. | Jan. 14, 1958 |